May 19, 1964     W. C. CONKLING     3,133,441
STABILIZING DEVICE FOR VARIABLE RESTRICTION FLUID FLOW METERS
Filed Sept. 13, 1960
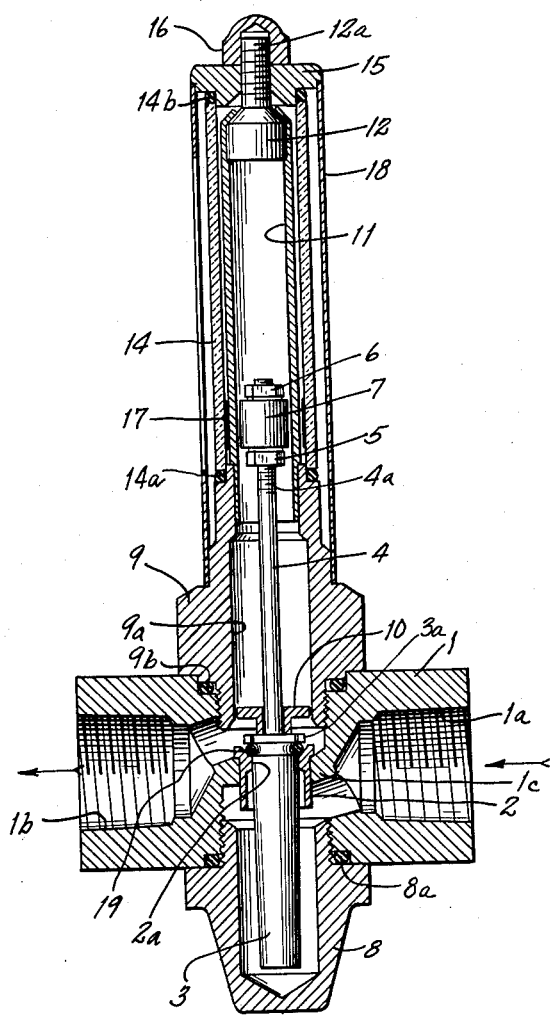
INVENTOR.
WILLIAM C. CONKLING
BY Lester W. Clark
ATTORNEY

United States Patent Office 3,133,441
Patented May 19, 1964

3,133,441
STABILIZING DEVICE FOR VARIABLE RESTRICTION FLUID FLOW METERS
William C. Conkling, Essex Fells, N.J., assignor to Wallace & Tiernan Incorporated, Belleville, N.J., a corporation of Delaware
Filed Sept. 13, 1960, Ser. No. 55,637
4 Claims. (Cl. 73—210)

This invention relates to variable restriction fluid flow meters, and especially to meters having floats which are stabilized against vertical oscillation.

A variable restriction flow meter of the type described herein comprises a vertically extending conduit through which the fluid to be measured flows upwardly, and a float which rides in the stream of fluid within the vertical conduit and cooperates with the conduit to define a variable metering restriction of annular cross-section. One common type of meter has a tapered elongated float in a shorter cylindrical conduit while another type has an elongated tapered tube and a shorter float. In either type, the area of the passage open to the flow of fluid increases as the float moves upwardly. While a complete analysis of the various upward and downward forces acting on the float is complex, it is well known that for any given fluid passing the float, the vertical position of the float is constant for a constant rate of flow, so that the vertical float position may be used as a measure of the rate of flow. Various indicating mechanisms are employed to measure the vertical position of the float.

Vertical oscillation of the float may be encountered in any variable restriction meter but is especially likely to occur in the tapered float meters. A meter configuration with a float of comparatively high mass is inherently much less stable, compared with a configuration with a float of comparatively low mass and with other compensating physical dimensions to result in an equivalent flow. Due to the nature of the configuration of the tapered float type meter and the flow laws that relate float weight to magnitude of flow, the mass of the float is commonly higher in the tapered float type meter than it is in the tapered tube type meter for a given fluid flow and thus is particularly susceptible to vertical oscillation. The vertical oscillation is undesirable since it makes the meter difficult to read and may result in inaccurate measurement.

The invention is described herein as applied to a metal enclosed meter having a magnetically actuated indicator. While the invention is particularly useful in connection with such a meter, it has a broader utility with other types of meters.

An object of the invention is to provide a variable restriction fluid flow meter including float means which is damped against vertical oscillation.

The foregoing and other objects of the invention are attained in the apparatus described herein, wherein the float means includes, besides the float per se, a stem which moves inside a cylinder closed at one end and located in the meter housing, and an annular disc slidably received on the stem with a clearance of a few thousandths of an inch between the disc and the stem. A clearance of the same order of magnitude is provided between the periphery of the disc and the inside of the cylinder. The lower end of the stem terminates in a shoulder, on which the disc rests when the float is stable.

During an upward movement of the float with the disc resting thereon, the fluid displaced by the movement of the disc must flow through the close clearance between the disc and the cylinder wall. The movement of the disc is thereby retarded, and since the disc is supported by the float, the movement of the float is also retarded.

On the other hand, when the float moves downwardly, although the movement of the disc is retarded due to the restricted clearances between the disc and the wall and between the disc and the stem, that retardation is not transferred to the float itself. The result is that the effective mass of the float means is different for rapid movement in the upward direction than for equally rapid movement in the downward direction, and the frictional or viscous force opposing motion of the float is different in the upward direction than in the downward direction. The net effect is to damp effectively oscillation of the float in the vertical direction.

Other objects and advantages of the invention will become apparent from a consideration of the following specification and claims, taken in connection with the accompanying drawing.

The single figure of the drawing is a vertical cross-sectional view through a meter embodying the invention.

In the drawing, there is shown a meter housing 1 having an internally threaded inlet 1a at its right-hand end and an internally threaded outlet 1b at its left-hand end. The housing 1 is provided with a transverse, horizontally extending septum 1c having a central vertically extending opening for receiving an orifice sleeve 2. The septum 1c separates the inlet 1a from the outlet 1b. The sleeve 2 is sealingly fitted to the septum 1c. The sleeve 2 is provided near its upper end with an inwardly projecting shoulder having an inner cylindrical surface 2a which defines the outer periphery of the metering passage.

A float means includes a tapered float 3 located within the metering passage 2a and a stem 4 extending upwardly from the float 3 and provided with a threaded extension 4a at its upper end. On the threaded extension 4a are a pair of nuts 5 and 6, which hold firmly in place between them a permanent magnet 7. Suitable lock washers are provided between the magnet 7 and the nuts.

The float 3 extends downwardly through an opening in the housing 1, its lower end extending into a recess formed in a closed end fitting 8 which is threadedly inserted into the housing 1. An O-ring seal 8a is provided between the fitting 8 and housing 1, as shown. The fitting 8 is aligned vertically with the orifice sleeve 2.

Another fitting 9 is threadedly inserted into the housing 1 above and in vertical alignment with the orifice sleeve 2. The fitting 9 is provided with an internal cylindrical surface 9a, which encircles and is spaced from the stem 4. Another O-ring seal 9b is provided between the fitting 9 and the housing 1.

The lower end of the stem 4 terminates at a hexagonal shoulder 3a formed on the upper end of the float 3. A disc 10 is mounted for slidable movement on the stem 4 and also for slidable movement within the cylinder 9a. By mounting for slidable movement, it is meant that the dimensions of the stem 4, the cylinder wall 9a, and the disc 10, are so selected that there is a clearance of the order of a few thousandths of an inch between the disc 10 and the stem 4 and also between the periphery of the disc 10 and the cylinder wall 9a.

A non-magnetic metal sleeve 11 has its lower end sealingly received within the upper end of the fitting 9. The upper end of the sleeve 11 sealingly receives the head of a plug 12, and its extremity is rolled over a shoulder on the plug 12 to form a tight seal. A threaded post 12a extends upwardly from the plug 12.

A glass tube 14 has its lower end resting on an O-ring 14a serving as a cushion and seal, and which in turn rests on a shoulder formed on the fitting 9. A similarly functioning O-ring 14b is held in place between the upper end of the tube 14 and a cap 15 held by a nut 16 which threadedly engages the post 12a. An annular follower 17, of ferro-magnetic material, is received within and guided by the glass tube 14. A suitable scale may be provided on the glass tube 14 for reading the vertical position of the follower 17. The glass tube 14 is preferably enclosed, except on one side, by a metal tubular shield 18.

The upper end of the float 3 is grooved to receive an O-ring seal 19 which abuts the sleeve 2 when the float 3 is at the bottom of its travel. The inner diameter of the upper end of orifice sleeve 2 is tapered to admit the O-ring 19 in sealing engagement to prevent backward flow through the meter.

*Operation*

When fluid flows through the inlet 1a, the float means (which comprises the float 3, stem 4, magnet 7 and disc 10) is lifted. As the float means moves upwardly, the passage area open to the flow of fluid increases because of the taper of the float 3. When a point is reached where the upward forces acting on the float equals the downward forces, the float comes to rest in an equilibrium position which is a measure of the rate of flow. If the flow then drops to a lower rate, the upward forces decrease, and the float moves down, thereby further restricting the passage area until the upward forces again balance the downward forces. The float then comes to rest in a new equilibrium position which is a measure of the new rate of flow. The passage area and the vertical position of the float means are related to the rate of flow through the meter. The scale 14 may be calibrated to reflect that relationship in terms of the rate of fluid flow.

The metal enclosed meter illustrated, with a follower indicator actuated by a permanent magnet, is used where the fluids being measured are hazardous or where they may be opaque, so that the vertical float position cannot be read directly through a glass tube.

The cylinder 9a forms part of a chamber which is closed at its upper end and open at its lower end to the conduit through which fluid is flowing. When the float means is moving upwardly in that chamber, some fluid must pass between the close clearance between the disc 10 and the cylinder wall 9a. This restricted path of flow past the disc 10 slows or snubs the movement of the disc and hence of the float means in the upward direction. This snubbing action absorbs kinetic energy from the float means. On the other hand, when the float moves downwardly, the snubbing action is applied only to the disc. The other parts of the float means may move more rapidly downward, leaving the disc behind. It may therefore be seen that the mass of the float means effectively has a higher value when the float means is moving upwardly, and a lower value when the float means is moving downwardly. It may also be seen that the upward movement of the float means is opposed by the snubbing action of the disc 10, whereas for rapid downward movement such snubbing action is effective only on the disc and not on the other parts of the float means.

If the float means tends to oscillate, then on each downward movement of the oscillation cycle, the float 3 will leave the disc 10 behind, and on the next upward movement, the disc 10 will have moved down a short distance from its maximum upward position, and the float will encounter the disc 10 before it reaches its maximum elevation.

It may be seen that the structure disclosed opposes oscillating tendencies by disturbing natural oscillating frequencies in at least three different ways, namely:

(1) By absorbing kinetic energy from the float means during attempted oscillation thereof;

(2) By providing a different mass for the float means during its upward movement than during its downward movement; and (3) By providing a different snubbing action on the float means during its upward movement than during its downward movement.

These three and perhaps other anti-oscillation factors are cooperating in my apparatus in a rather complex manner. It should therefore be understood that the invention is not to be limited to any specific theory of operation of the oscillation damping arrangement.

While I have shown and described a preferred embodiment of my invention, other modifications thereof will readily occur to those skilled in the art, and I therefore intend my invention to be limited only by the appended claims.

I claim:

1. A fluid flow meter of the variable restriction type, comprising:
   (a) a stationary member;
   (b) means including said member defining a vertically extending passage for fluid flow;
   (c) a movable float member in the passage;
   (d) one of said members having a vertically elongated tapered surface so that the cross-sectional area between the members open to fluid flow varies with the vertical position of the float member;
   (e) said float member moving in response to the pressure difference between the upstream and downstream sides of the float member to a vertical position wherein said cross-sectional area accommodates the flow due to that pressure difference, whereby the vertical position of the float member is an indication of the rate of flow;
   (f) means to inhibit vertical oscillation of the float member including:
      (1) means fixed to said passage defining means and defining a vertically extending chamber closed at one end and opening at its other end into said passage;
      (2) support means rigidly connected to the float member for vertical movement therewith, said support means and said chamber defining means being dimensioned to provide substantial peripheral clearance between the support means and the chamber wall, so that the support means is free to move vertically in the chamber without substantial retardation by the fluid therein;
      (3) a disc within the chamber and adapted to rest upon said support means, said disc and said chamber defining means being dimensioned to provide a close clearance between the disc and the chamber wall;
      (4) said disc, said chamber defining means, and the fluid in the chamber cooperating to retard movement of the disc due to the time required for the fluid to pass through said close clearance, said retardation of the disc being transmitted to the float during upward float movement, and being effective upon rapid downward movement of the float to effect a separation of the float and disc;
      (5) said disc resting upon the float during upward movement thereof and not during rapid downward movement thereof;
      (6) whereby vertical oscillation of the float is damped due to greater retarding forces acting on the float and greater effective mass of the float during upward movement than during downward movement.

2. A fluid flow meter as defined in claim 1, including:
   (a) a stem fixed to the support means and extending into said chamber;
   (b) said disc being annular in form and having a central opening larger than the stem so that it may freely slide on the stem, said stem and the surface of said central opening being dimensioned to provide a close clearance to restrict passage of the fluid during disc movement.

3. A fluid flow meter of the variable restriction type, comprising:
   (a) a stationary member;
   (b) means including said member defining a vertically extending passage for fluid flow, with an orifice of fixed diameter therein;
(c) inlet means communicating with the lower end of the passage;
(d) outlet means communicating laterally with the upper end of the passage;
(e) a vertically tapered float member vertically movable in the orifice so that the cross-sectional area between the members open to fluid flow varies with the vertical position of the float member;
(f) said float member moving in response to the pressure difference between the upstream and downstream sides of the float member to a vertical position wherein said cross-sectional area accommodates flow due to that pressure difference, whereby the vertical position of the float member is an indication of the rate of flow;
(g) means to inhibit vertical oscillation of the float member including:
   (1) means fixed to said passage defining means and defining a vertically extending chamber aligned with the passage and above said outlet means, said chamber being closed at its upper end and opening at its lower end into said passage;
   (2) support means rigidly connected to the float member for vertical movement therewith, said support means and said chamber defining means being dimensioned to provide substantial peripheral clearance between the support means and the chamber wall, so that the support means is free to move vertically in the chamber without substantial retardation by the fluid therein;
   (3) a stem fixed to the top of the support means, and extending vertically upward therefrom, said stem having a relatively small diameter;
   (4) an annular disc within the chamber and adapted to rest upon said support means, said disc being dimensioned to provide close clearances between the disc and the chamber wall, and between the inner surface of the disc and said stem;
   (5) said disc, the adjacent surfaces of said chamber wall and of said stem, and the fluid in the chamber cooperating to retard movement of the disc due to the time required for the fluid to pass through said close clearances, said retardation of the disc being transmitted to the float during upward float movement, and being effective upon rapid downward movement of the float to effect a separation of the float and disc;
   (6) said disc resting upon the float during upward movement thereof and not during rapid downward movement thereof;
   (7) whereby vertical oscillation of the float is damped due to greater retarding forces acting on the float and greater effective mass of the float during upward movement than during downward movement.

4. A float assembly for a variable restriction fluid flow meter, comprising:
(a) a vertically tapered plug adapted to move vertically in an orifice of fixed diameter to create a variable restriction to the flow of fluid through the orifice;
(b) a stem fixed to the top of the plug and extending vertically upward therefrom in axial alignment therewith, said stem having a relatively small diameter;
(c) said plug having on its upper end a shoulder of a diameter substantially larger than the stem; and
(d) an annular disc encircling the stem and having an inner diameter slightly larger than the stem diameter to provide a close clearance between the disc and the stem, said inner diameter being smaller than the shoulder diameter so that the disc may rest on the shoulder, said disc having an outer diameter substantially greater than the shoulder diameter.

References Cited in the file of this patent
UNITED STATES PATENTS

| | | |
|---|---|---|
| 1,431,511 | Claassen | Oct. 10, 1922 |
| 1,621,354 | Dawley | Mar. 15, 1927 |
| 2,182,469 | Davis | Dec. 5, 1939 |
| 2,431,722 | Xenis et al. | Dec. 2, 1947 |